(12) United States Patent
Bogdan (10) Patent No.: US 6,249,284 B1
(45) Date of Patent: *Jun. 19, 2001

(54) DIRECTIONAL NAVIGATION SYSTEM IN LAYOUT MANAGERS

(75) Inventor: Jeffrey L. Bogdan, Redmond, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,315

(22) Filed: Apr. 1, 1998

(51) Int. Cl.[7] .................................................... G06F 3/06
(52) U.S. Cl. .......................... 345/357; 345/339; 345/340; 345/341; 345/145
(58) Field of Search ..................................... 345/340, 341, 345/342, 334, 336, 145, 339, 357; 706/10

(56) References Cited

U.S. PATENT DOCUMENTS

| 4,916,656 | 4/1990 | Sasaki ................................. 364/900 |
| 4,937,745 | 6/1990 | Carmon ............................... 364/419 |
| 5,237,654 | 8/1993 | Shackelford et al. . |
| 5,312,478 | 5/1994 | Reed et al. ........................... 395/148 |
| 5,339,391 | 8/1994 | Wroblewski et al. ............... 395/157 |
| 5,371,846 | 12/1994 | Bates et al. ......................... 395/157 |
| 5,388,196 * | 2/1995 | Pajek et al. ......................... 345/340 |
| 5,402,152 | 3/1995 | Needham ............................. 345/179 |
| 5,418,549 | 5/1995 | Anderson et al. .................... 345/145 |
| 5,452,406 | 9/1995 | Butler et al. ........................ 395/126 |
| 5,479,600 | 12/1995 | Wroblewski et al. ............... 395/157 |
| 5,506,951 | 4/1996 | Ishikawa ............................. 395/157 |
| 5,517,603 | 5/1996 | Kelley et al. ........................ 395/126 |
| 5,526,480 | 6/1996 | Gibson ................................ 395/154 |
| 5,528,735 * | 6/1996 | Strasnick et al. .................... 345/427 |
| 5,532,715 | 7/1996 | Bates et al. .......................... 345/123 |

(List continued on next page.)

OTHER PUBLICATIONS

Microsoft Windows NT 4.0, 1996.*
Platform SDK, MSDN Library, Jul. 1999.
Visual C++ Programmers's Guide, MSDN Library, Jul. 1999.
Microsoft Foundation Classes and Templates, Class Library Reference, MSDN Library, Jul. 1999.
Locke, Jonathan, Microsoft Visual J++, *Microsoft Interactive Developer*, Dec. 1996.
Cornell, Gary and Horstmann, Cay S., Core Java, Chapter 7, Second Edition, The SunSoft Press, Java Series.
Saganich, A1, "Introducing the AFC", Copyright 1997, The Cobb Group.

(List continued on next page.)

*Primary Examiner*—Raymond J. Bayerl
*Assistant Examiner*—Thomas J Joseph
(74) *Attorney, Agent, or Firm*—Klarquist Sparkman Campbell Leigh & Whinston, LLP (57) ABSTRACT

A directional navigation system implemented in layout managers separate from the containers and/or components to which each layout manager is assigned. Components at the container and/or component level are responsible for the tasks of receiving and identifying user generated directional navigation input and of assigning a new input focus at the direction of a layout manager. A navigator portion of one or more layout managers are responsible for the tasks of processing the directional navigation input to identify the next nearest component that can take input focus in response to the user generated directional navigation input. Multiple layout managers are called upon to identify the next nearest component that can take input focus if the magnitude of a requested input focus change is beyond the scope of the set of components to which any one layout manager has responsibility.

14 Claims, 6 Drawing Sheets

U.S. PATENT DOCUMENTS

| | | | | |
|---|---|---|---|---|
| 5,548,703 | | 8/1996 | Berry et al. | 395/160 |
| 5,553,225 | | 9/1996 | Perry | 395/157 |
| 5,555,354 | * | 9/1996 | Strasnick et al. | 345/427 |
| 5,561,752 | | 10/1996 | Jevans | 395/133 |
| 5,590,267 | | 12/1996 | Butler et al. | 395/340 |
| 5,619,628 | | 4/1997 | Fujita et al. | 395/127 |
| 5,655,094 | | 8/1997 | Cline et al. | 395/341 |
| 5,673,401 | | 9/1997 | Volk et al. | 395/327 |
| 5,692,173 | | 11/1997 | Chew | 395/603 |
| 5,692,205 | | 11/1997 | Berry et al. | 395/788 |
| 5,706,505 | | 1/1998 | Fraley et al. | |
| 5,717,877 | | 2/1998 | Orton et al. | 395/326 |
| 5,739,819 | | 4/1998 | Bar-Nahum | 345/426 |
| 5,754,808 | | 5/1998 | Tanaka et al. | 395/339 |
| 5,796,404 | | 8/1998 | Gentner | 345/352 |
| 5,828,374 | | 10/1998 | Coleman et al. | 345/341 |
| 5,831,606 | | 11/1998 | Nakajima et al. | |
| 5,838,319 | | 11/1998 | Guzak et al. | |
| 5,838,330 | | 11/1998 | Ajima | 345/427 |
| 5,854,634 | | 12/1998 | Kroitor | 345/473 |
| 5,861,885 | * | 1/1999 | Strasnick et al. | 345/355 |
| 5,870,098 | | 2/1999 | Gardiner | 345/426 |
| 5,872,566 | | 2/1999 | Bates et al. | 345/341 |
| 5,874,958 | * | 2/1999 | Ludolph | 345/339 |
| 5,874,961 | | 2/1999 | Bates et al. | 345/341 |
| 5,877,766 | | 3/1999 | Bates et al. | 345/357 |
| 5,896,132 | | 4/1999 | Berstis et al. | 345/341 |
| 5,903,271 | | 5/1999 | Bardon et al. | 345/419 |
| 5,905,492 | * | 5/1999 | Straub et al. | 345/333 |
| 5,913,063 | | 6/1999 | McGurrin et al. | 395/702 |
| 5,923,328 | | 7/1999 | Griesmer | |
| 5,933,549 | | 8/1999 | Ide et al. | |
| 5,943,052 | | 8/1999 | Allen et al. | 345/341 |
| 5,956,736 | | 9/1999 | Hanson et al. | 707/513 |
| 5,966,133 | | 10/1999 | Hoppe | 345/420 |
| 5,973,663 | | 10/1999 | Bates et al. | 345/123 |
| 5,977,972 | | 11/1999 | Bates et al. | 345/341 |
| 5,986,661 | | 11/1999 | Hemingway | 345/421 |
| 6,005,573 | | 12/1999 | Beyda et al. | 345/341 |
| 6,028,601 | * | 2/2000 | Machiraju et al. | 345/336 |
| 6,072,485 | | 6/2000 | Barnes et al. | 345/339 |
| 6,111,573 | * | 2/2000 | McComb et al. | 345/334 |

OTHER PUBLICATIONS

Locke, Jonathan, "Socket to Me: Live Data Graphing", *Microsoft Interactive Developer*, Mar. 1997.

Mitchell, Tom, "Taming the GridBagLayout Class", Copyright 1998, ZD Journals.

Fuller, Scott, "Java Graphics Unleashed: The Microsoft Application Foundation Classes", *Microsoft Interactive Developer*, Aug. 1997.

Win 32 Programmers Reference, Chapter 14, Microsoft Press, 1993.

Microsoft Windows 98 Official Preview Kit, pp. 49–53, Microsoft Press, 1997.

* cited by examiner

DIRECTIONAL NAVIGATION SYSTEM IN LAYOUT MANAGERS

FIELD OF THE INVENTION

This invention relates to User Interface (UI) controls, and in particular, to UI navigation controls in layout managers that facilitate directional navigation among containers, and components within containers, on a display screen.

Problem

User Interface controls, in the context of this document, are the mechanisms or processes that facilitate operational aspects of User Interface features that are available to a user. User Interface features commonly have a visual aspect to them and are organized hierarchically as objects called components, containers, and viewers.

In early UI navigation controls for computing systems, a viewer was the controlling interface between a user's display screen and an application program or other dialog. For example, a programmer designing an application program would create a screen display that included a plurality of data entry fields each linked together in a predefined sequential order. A user would enter data in one data entry field at a time while the viewer control automatically moved the cursor to each successive data entry field as each prior data entry field was satisfied. The user could go forward to a next data entry field by pressing the TAB key. The user could also back up to an earlier data entry field by pressing the SHIFT-TAB key combination to step back one data entry field at a time until the cursor arrived at the earlier data entry field.

However, one problem with the early viewer controls was that they only allowed sequential stepwise forward and backward movement among data entry fields in a given display screen. Further, little or no control was allowed for forward or backward movement among pages of display screens. In addition, each application was required to implement and manage the layout and navigation of components on its own without assistance from other applications. For these and other reasons, existing viewer controls were and are undesirable as users demand more and more flexible UI navigation controls.

One improvement over the undesirable sequential stepwise viewer control is he use of layout managers. Layout managers can compartmentalize elements of a display screen into containers, and components within containers, so that an individual container can have its own viewer controls while the layout manager facilitates control of the position and size of individual containers and components within a container. However, even with the use of layout managers, directional navigation remains up to individual applications to implement and maintain.

For these reasons, there exists an ongoing need for a more flexible and uniform system of directional navigation among containers and components within containers. A system of this type has heretofore not been known prior to the invention as disclosed below.

Solution

The problems identified above are solved and an advancement is achieved in the field of UI navigation controls due to the directional navigation system in layout managers of the present invention. The directional navigation system includes a navigator implementation in each layout manager that is separate from the containers and/or components to which each layout manager is assigned. Components at the container and/or component level need only be responsible for the tasks of receiving and identifying user generated directional navigation input and of assigning a new input focus to a next component at the direction of an assigned layout manager. The navigator portion of each layout manager is responsible for the tasks of processing the directional navigation input by searching for the next nearest component that can take input focus in response to the user generated directional navigation input. Multiple layout managers are called upon to identify the next nearest component that can take input focus in the event that the magnitude and/or direction of a requested input focus change is beyond the scope of the set of components to which any one layout manager has responsibility.

Implementing the directional navigation controls at the layout manager level frees individual containers and/or components from the burden of navigation implementation details. For purposes of the present discussion, a container is a component that includes other lower level components. The relationships between components and containers are further detailed in the text accompanying FIG. 2.

The directional navigation system in layout managers facilitates navigation among containers and among components within containers based on a uniform set of directional navigation indicators. The directional navigation indicators are events that include, but are not limited to, the directional arrow keys, page up and page down keys, and the home and end keys. For example, in the context of an electronic form the present invention would facilitate user directed input focus movement in an incremental stepwise manner among individual data entry fields within a form, in addition to jumping to the beginning or end of a form, or from one form page to the next, all in a random user dictated manner.

An active component of a UI is said to have input focus if it is the display object that is presently set to receive user generated input at a given moment. An active component responds to keyboard input events by determining whether the event represents data or directional navigation instructions. If the event is one of a set of predefined directional navigation indicators, then the event is passed to the component's layout manager for processing. The navigator portion of the responsible layout manager processes the directional navigation indicator by finding the next nearest component that can take input focus as dictated by the magnitude and direction of the directional navigation indicator.

DETAILED DESCRIPTION

Figure 1:
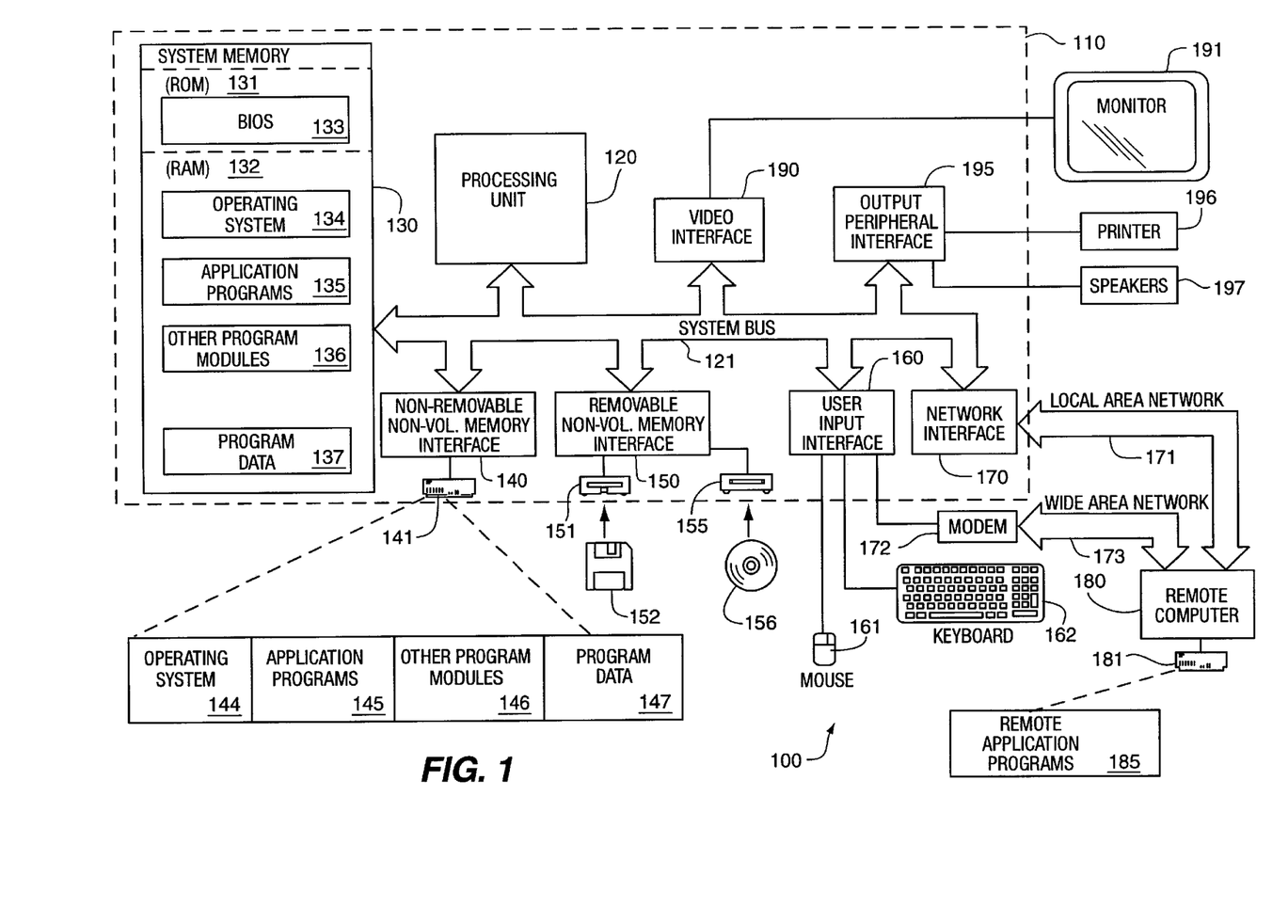
FIG. 1 illustrates an example of a computing system environment in block diagram form on which the claimed invention could be implemented.

Computing System Environment—FIG. 1

FIG. 1 illustrates an example of a computing system environment 100 on which the claimed invention could be implemented. The computing system environment 100 is only one example of a suitable computing environment for the claimed invention and is not intended to suggest any limitation as to the scope of use or functionality of the claimed invention. Neither should the computing environment 100 be interpreted as having any dependency or requirement relating to any one or combination of components illustrated in the exemplary computing system environment 100.

The claimed invention is operational with numerous other general purpose or special purpose computing system environments or configurations. Examples of well known computing systems, environments, and/or configurations that may be suitable for use with the claimed invention can include, but are also not limited to, a general purpose Personal Computer (PC), hand-held or lap top computers, multiprocessor systems, microprocessor-based systems, programmable consumer electronics, network computers, Personal Communication Systems (PCS), Personal Digital Assistants (PDA), minicomputers, mainframe computers, distributed computing environments that include any one or more of the above computing systems or devices, and the like.

The claimed invention may also be described in the general context of computer-executable instructions that are executable on a PC. Such executable instructions include the instructions within program modules that are executed on a PC for example. Generally, program modules include, but are not limited to, routines, programs, objects, components, data structures, and the like that perform discrete tasks or implement abstract data types. The claimed invention may also be practiced in distributed computing environments where tasks are performed by remote processing devices that are linked through a communications network. In a distributed computing environment, program modules may be located in both local and remote memory devices.

The exemplary computing system environment 100 is a general purpose computing device such a PC 110. Components of PC 110 include, but are not limited to, a processing unit 120, a system memory 130, and a system bus 121. The system bus 121 communicatively connects the aforementioned components and numerous other cooperatively interactive components.

Processing unit 120 is the primary intelligence and controller for PC 110 and can be any one of many commercially available processors available in the industry. System bus 121 may be any combination of several types of bus structures including, but not limited to, a memory bus, a memory controller bus, a peripheral bus, and/or a local bus. System bus 121, also referred to as an expansion bus or I/O channel, can be based on any one of a variety of bus architectures including, but not limited to, Industry Standard Architecture (ISA) bus, Micro Channel Architecture (MCA), Enhanced ISA (EISA), Video Electronics Standards Association (VESA) local bus, and Peripheral Component Interconnect (PCI) also known as Mezzanine bus.

System memory 130 is a volatile memory that can include a Read Only Memory (ROM) 131 and/or a Random Access Memory (RAM) 132. ROM 131 typically includes a Basic Input/Output System (BIOS) 133. BIOS 133 is comprised of basic routines that control the transfer of data and programs between peripheral non-volatile memories that are accessible to PC 110 during start-up or boot operations. RAM 132 typically contains data and/or programs that are immediately accessible to and/or presently being operated on by processing unit 120. Types of data and/or programs in RAM 132 can include operating system programs 134, application programs 135, other program modules 136, and program data 137.

Other components in PC 110 include numerous peripheral devices that are accessible to processing unit 120 by way of system bus 121. The peripheral devices are supported by appropriate interfaces that can include a first non-volatile memory interface 140 for non-removable non-volatile memory device support, a second non-volatile memory interface 150 for removable non-volatile memory device support, a user input interface 160 for serial device support, a network interface 170 for remote device communication device support, a video interface 190 for video input/output device support, and an output peripheral interface 195 for output device support.

Examples of a non-removable non-volatile memory device can include a magnetic disk device 141 or other large capacity read/write medium such as an optical disk, magnetic tape, optical tape, or solid state memory. Types of data often stored on a non-removable non-volatile memory device include persistent copies of programs and/or data being used and/or manipulated in RAM 132 such as operating system programs 144, application programs 145, other program modules 146, and program data 147.

One example of a removable non-volatile memory device can include a magnetic floppy disk device or hard disk device 151 that accepts removable magnetic media 152. Another example of a removable non-volatile memory device can include an optical disk device 155 that accepts removable optical media 156. Other types of removable media can include, but are not limited to, magnetic tape cassettes, flash memory cards, digital video disks, digital video tape, Bernoulli cartridge, solid state RAM, solid state ROM, and the like.

User input interface 160 supports user input devices that can include, but are not limited to, a pointing device 161 commonly referred to as a mouse or touch pad, and a keyboard 162. Other user input devices can include, but are not limited to, a microphone, joystick, game pad, neuro-stimulated sensor, and scanner, and may require other interface and bus structures such as a parallel port, game port or a Universal Serial Bus (USB) for example.

User input/output devices supported by video interface 190 can include a display monitor 191 or a video camera. Output peripheral interface 195 supports output devices such as printer 196 and speakers 197.

Network interface 170 supports communications access to a remote computing facility such as remote computer 180 by way of Local Area Network (LAN) 171 and/or Wide Area Network (WAN) 173, or other Intranet or Internet connection. Other remote computing facility types for remote computer 180 can include, but are not limited to, a PC, server, router, printer, network PC, a peer device, or other common network node. A remote computer 180 can typically include many or all of the components described above for PC 110. Modulator/Demodulator (MODEM) 172 can also be used to facilitate communications to remote computer 180. Types of programs and/or data accessible from remote memory device 181 on remote computer 180 can include, but are not limited to, remote application programs 185.

Figure 2:
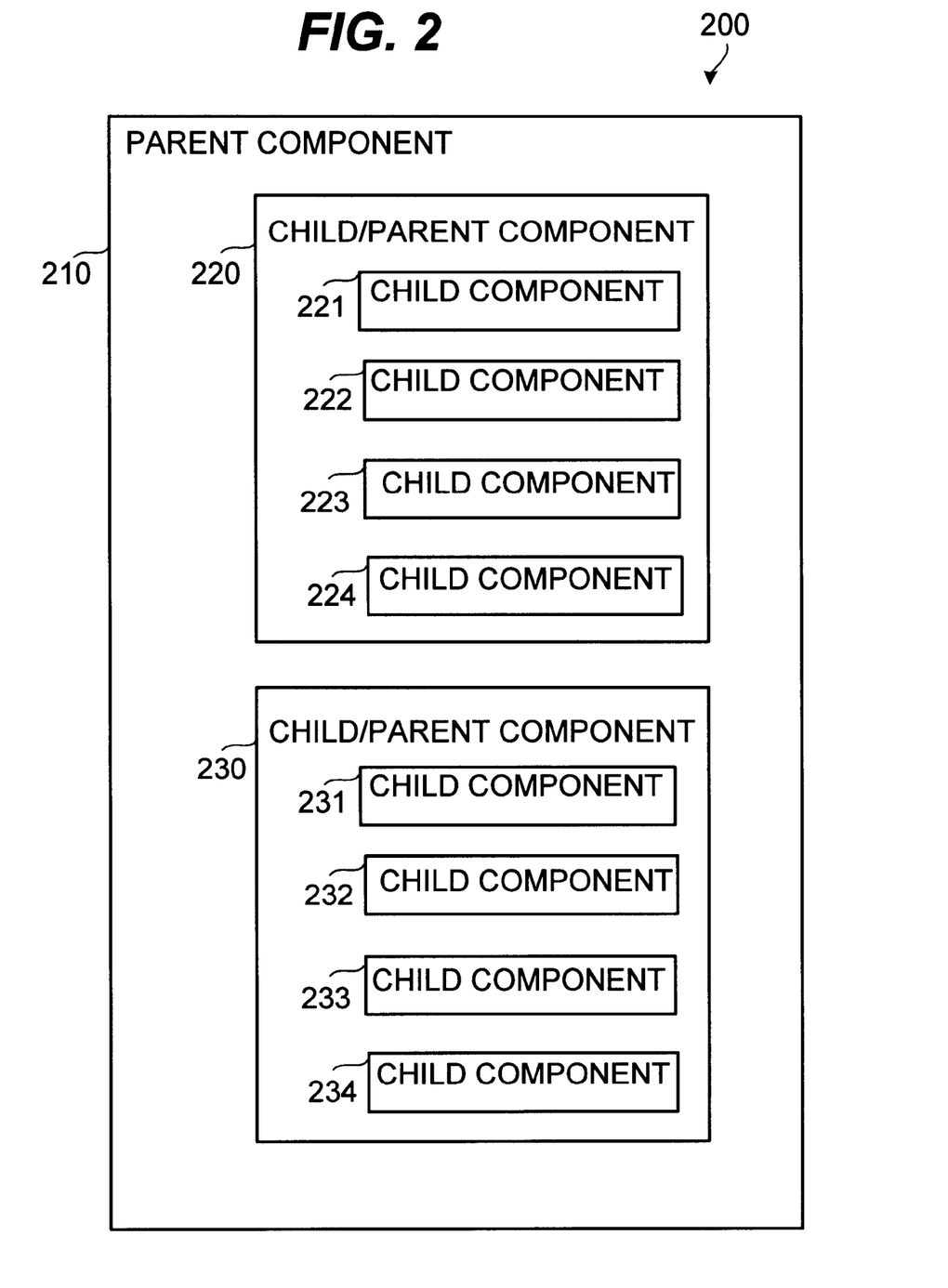
FIG. 2 illustrates an example of component and container relationships in block diagram form.

Component Relationship Example—FIG. 2

FIG. 2 illustrates an example of component and container relationships 200 in block diagram form as they might appear on the display screen of monitor 191. For purposes of the present discussion, a component is any visual object or element. Similarly, a container is a component that contains lower level components in a hierarchical manner. That is, a parent component can be a container that contains one or more child components.

For example, the component and container relationship example 200 illustrates eleven components 210–234 that are organized hierarchically. Component 210 is the top level of the component family hierarchy and is also referred to as a container or parent component because lower level or child components 220–234 are contained therein. Components 220 and 230 are also referred to as containers or parent components because lower level or child components 221–224 and 231–234 are contained respectively therein. Components 221–224 and 231–234 are the lowest level components that can have input focus in the present illustration. Examples of a component such as any one of the components 221–224 or 231–234 include, but are not limited to, a data entry field in an electronic form or a file name field an open folder/file window.

Figure 3:
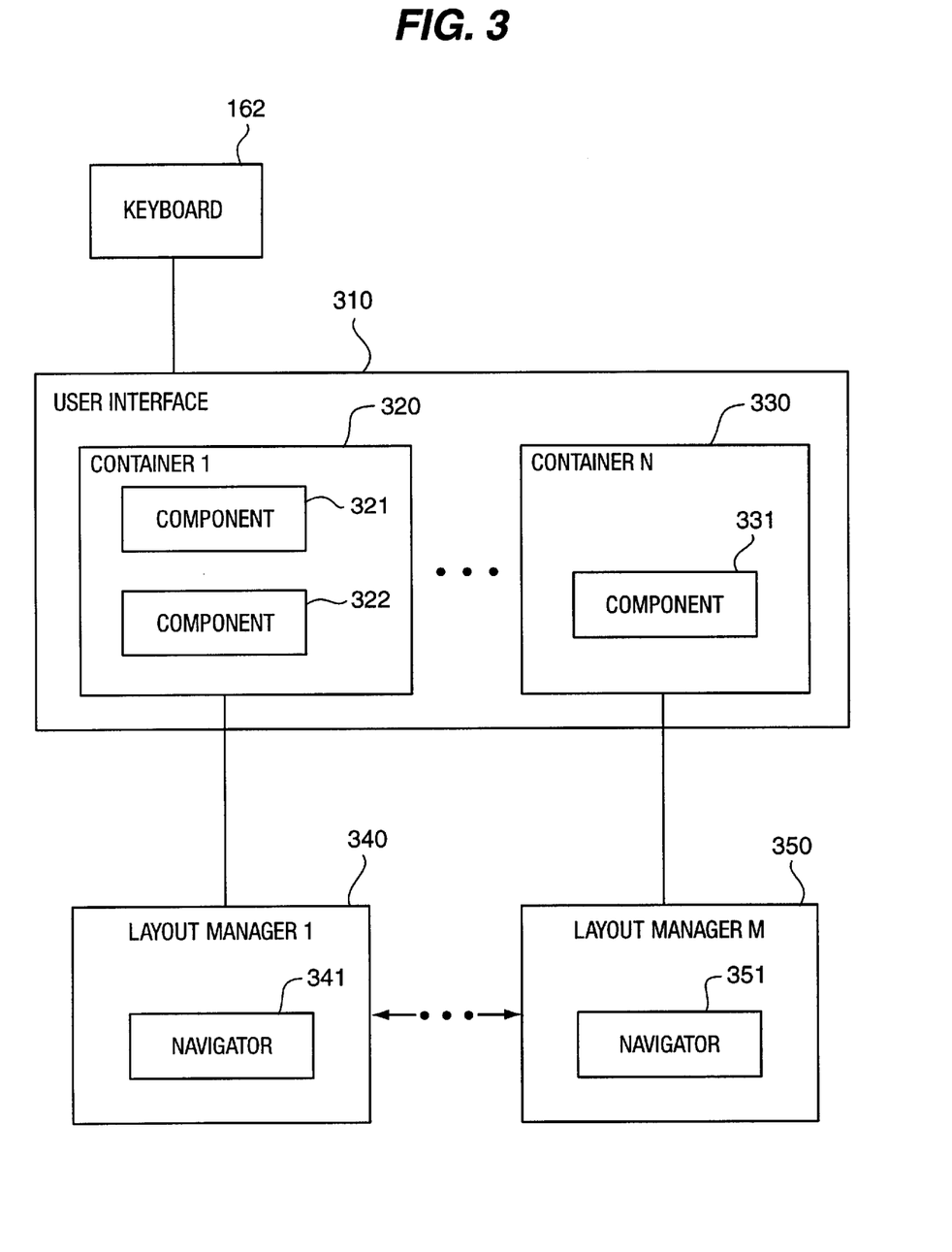
FIG. 3 illustrates an example of a user interface and layout manager configuration in block diagram form.

UI and Layout Manager Configuration—FIG. 3

FIG. 3 illustrates an example of a UI and layout manager configuration 300 in block diagram form. The UI and layout manager configuration 300 includes, but is not limited to, a user input device such as keyboard 162, a visual display 310 of N containers 320 through 330, and M layout managers 340 through 350. Each container 320 and 330 typically includes at least one component therein. In the present example, container 320 includes a first and second component 321–322 respectively, and container 330 includes one component 331. Each container 320 and 330 is the responsibility of a layout manager, although, more than one container can be assigned to a single layout manager. That is, the N number of components is greater than or equal to the M number of layout managers in a given system.

Each layout manager 340 and 350 includes a navigator 341 and 351 respectfully, also referred to as a navigator process. Navigators 341 and 351 are operable to respond to user generated directional input such as the input from keyboard 162. Which of the navigators 341 and 351 will process the user generated directional input depends on which of the associated components and/or containers presently has input focus. Having the navigators 341 or 351 control input focus changes and directional navigation among the containers and components removes the directional navigation implementation burden from the individual containers. Details of the directional navigation operational steps are disclosed in the text accompanying FIGS. 4–5A and 5B.

Figure 4:
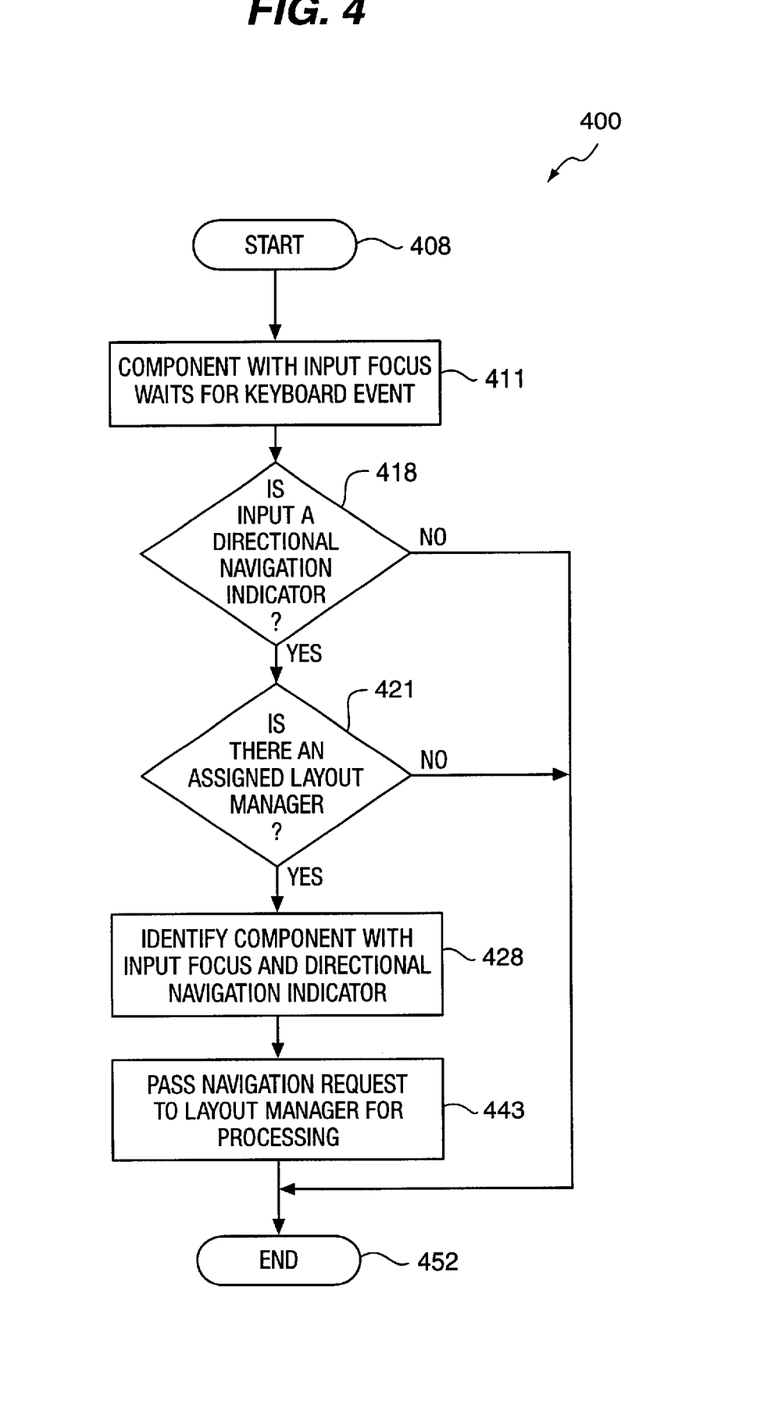
FIG. 4 illustrates an overview of the directional navigation system in layout managers in flow diagram form.
Figure 5A:
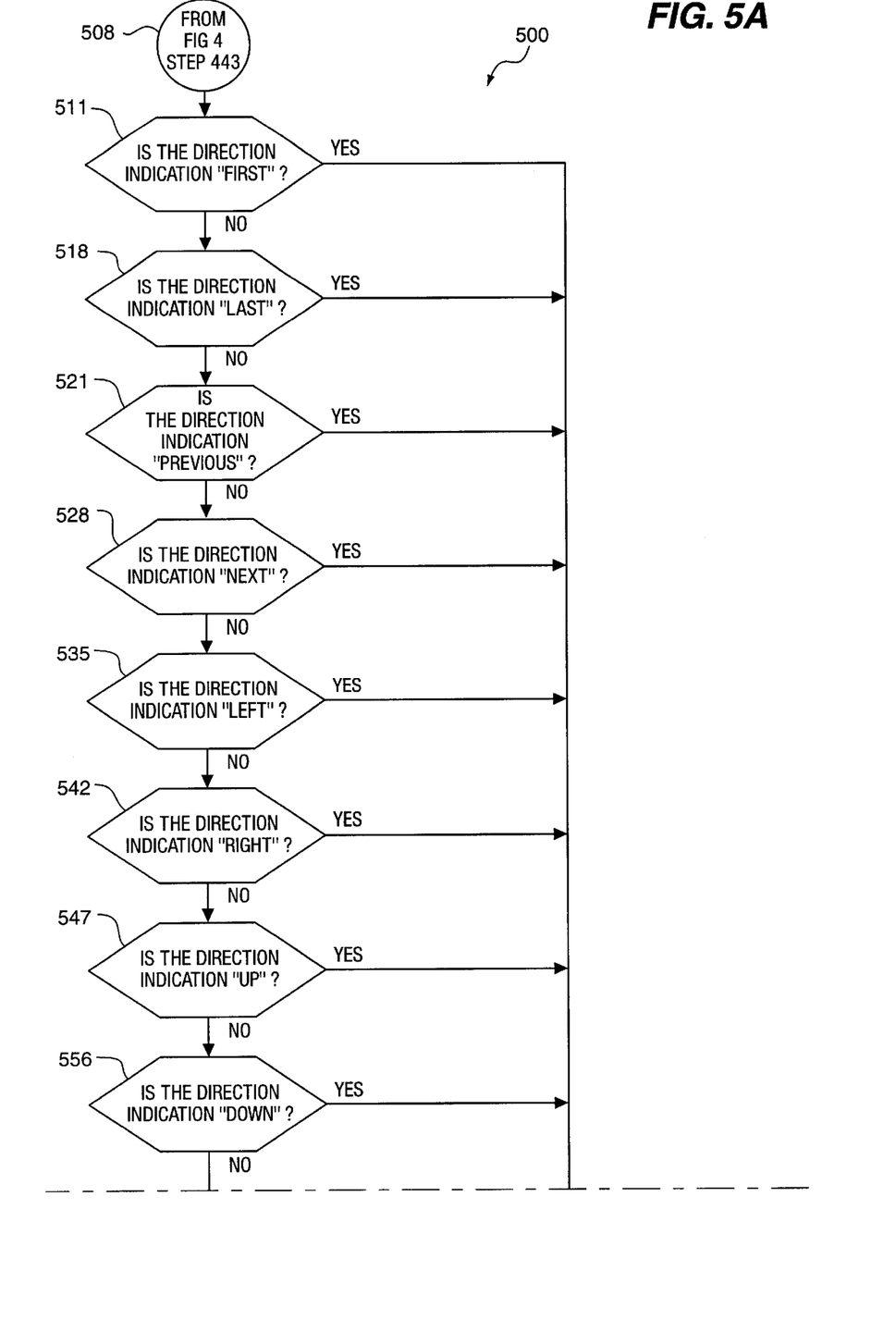
FIGS. 5A–5B illustrate the directional navigation system operational details in flow diagram form.
Figure 5B:
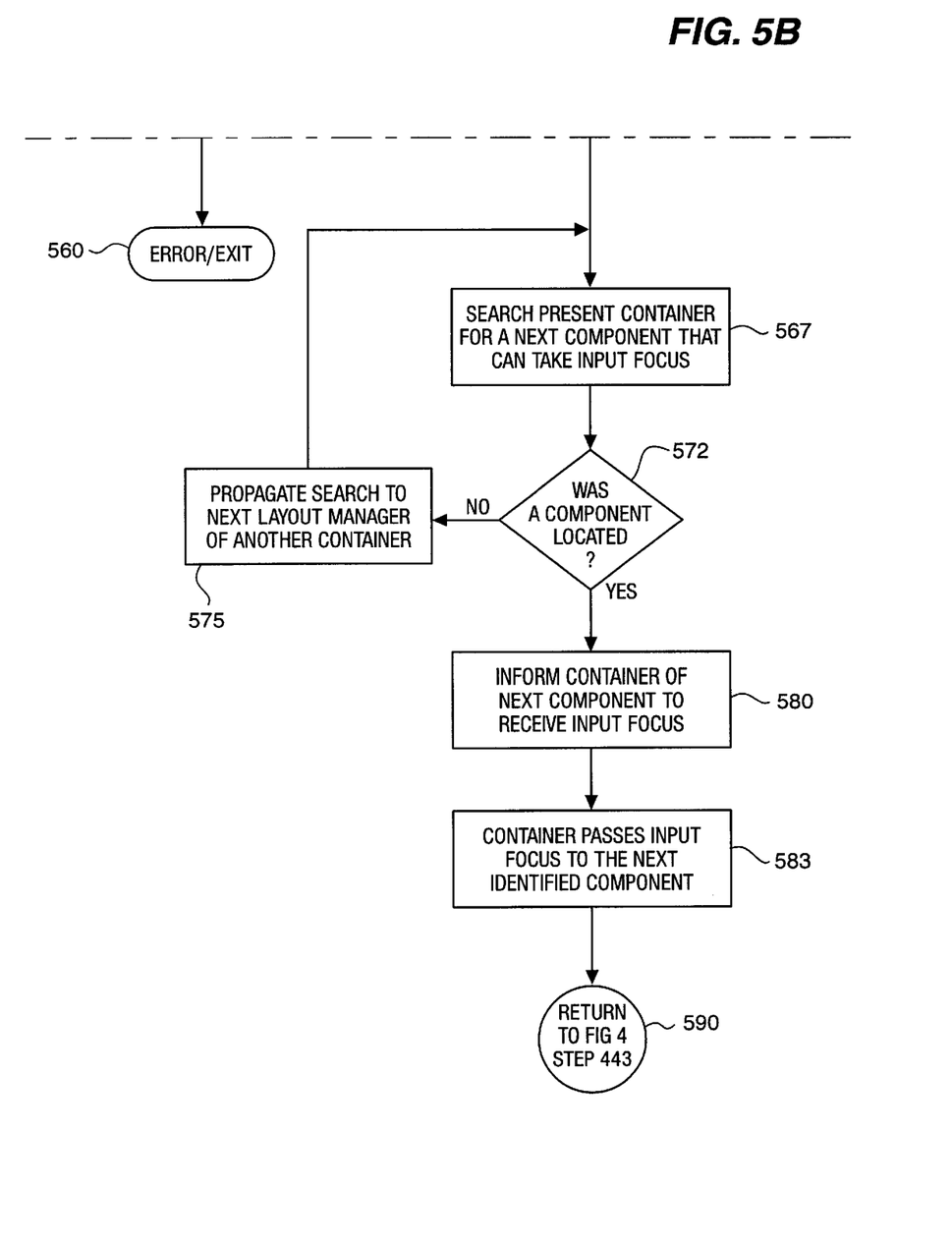

Directional Navigation System Operational Steps—FIGS. 4, 5A and 5B

FIG. 4 illustrates directional navigation system overview 400 in flow diagram form. The directional navigation system overview begins at step 408 and proceeds to step 411 where the component that has input focus waits for a keyboard event.

If it is determined at decision step 418 by the UI 310 that the keyboard event received by the component having input focus is a directional navigation indicator, then processing continues at step 421. Alternatively, if it is determined at decision step 418 by the UI 310 that the keyboard event received by the component having input focus is not a directional navigation indicator, then directional navigation system processing ends at step 452.

A directional navigation indicator can include, but is not limited to, user generated input from a keyboard that indicates a desired change from the component presently having input focus to a new component having input focus. The directional navigation indicators are grouped into levels according to the magnitude of the change in focus resulting from any one indicator. The levels include, but are not limited to:

Absolute—First (Home), Last(End)

Logical—Previous (Shift-Tab), Next (Tab), Page Up, Page Down, Layer Up, Layer Down Directional—Left Arrow, Right Arrow, Up Arrow, Down Arrow The directional indicators identified above represent levels of incremental focus movements while the logical and absolute directional indicators represent jumps of some predetermined extent. The larger jumps in focus can be to an adjacent or nearby component on a two-dimensional plane (previous, next, page up, page down), or to an adjacent component in a three-dimensional plane (layer up, layer down), or to the furthest extent of the UI (first, last, home, end). Other directional indicators can be defined as can alternative granularity of changes in focus as desired by a UI programmer.

If it is determined at decision step 421 by the UI 310 that no layout manager is assigned to the component that presently has input focus, then directional navigation system processing ends at step 452. Note that even if a layout manager does exist, certain keyboard events and/or directional navigation indicators can be handled by the UI 310 or by other processes beyond the scope of the present invention, and for this reason directional navigation system processing ends at step 452. Alternatively, if it is determined at decision step 421 by the UI 310 that a layout manager is assigned to the component that presently has input focus, then processing continues at step 428.

At step 428, the identity of the component and/or container having input focus and the directional navigation indicator just received, are transmitted to the assigned layout manager for processing. At step 443, the assigned layout manager activates the directional navigation system to process the component and/or container identification and the directional navigation indicator at issue to change the input focus to a new component and/or container as called for by the directional navigation indicator. Details of processing a directional navigation indicator are disclosed in the text accompanying FIGS. 5A–5B. Upon completion of the directional navigation indicator processing, directional navigation system processing ends at step 452. That is, the container and/or component now having input focus waits for user generated input as previously disclosed at step 411.

FIGS. 5A–5B illustrate the directional navigation system operational steps 500 in flow diagram form. The operational steps 500 begin at step 508 and are the details of step 443 of FIG. 4. The operational steps 500 represent a hierarchical progression of input focus directional navigation processing in a top-down manner from the absolute level to the logical level to the directional level. However, the levels of input focus directional navigation processing can be performed in any order as needed.

If it is determined at decision step 511 that the directional navigation indicator is a FIRST indicator, then processing continues at step 567. Alternatively, if it is determined at decision step 511 that the directional navigation indicator is not a FIRST indicator, then processing continues at step 518.

If it is determined at decision step 518 that the directional navigation indicator is a LAST indicator, then processing continues at step 567. Alternatively, if it is determined at decision step 518 that the directional navigation indicator is not a LAST indicator, then processing continues at step 521.

If it is determined at decision step 521 that the directional navigation indicator is a PREVIOUS indicator, then processing continues at step 567. Alternatively, if it is determined at decision step 521 that the directional navigation indicator is not a PREVIOUS indicator, then processing continues at step 528.

If it is determined at decision step 528 that the directional navigation indicator is a NEXT indicator, then processing continues at step 567. Alternatively, if it is determined at decision step 521 that the directional navigation indicator is not a NEXT indicator, then processing continues at step 535.

If it is determined at decision step 535 that the directional navigation indicator is a LEFT indicator, then processing continues at step 567. Alternatively, if it is determined at decision step 535 that the directional navigation indicator is not a LEFT indicator, then processing continues at step 542.

If it is determined at decision step 542 that the directional navigation indicator is a RIGHT indicator, then processing continues at step 567. Alternatively, if it is determined at decision step 542 that the directional navigation indicator is not a RIGHT indicator, then processing continues at step 547.

If it is determined at decision step 547 that the directional navigation indicator is a UP indicator, then processing continues at step 567. Alternatively, if it is determined at decision step 547 that the directional navigation indicator is not a UP indicator, then processing continues at step 556.

If it is determined at decision step 556 that the directional navigation indicator is a DOWN indicator, then processing continues at step 567. Alternatively, if it is determined at decision step 556 that the directional navigation indicator is not a DOWN indicator, then processing continues at step 560 where the operational steps 500 stop because directional navigation indicator possibilities have been checked and no match occurred.

At step 567, the navigator portion of the responsible layout manager begins a search starting from the component within the container that presently has input focus. The purpose of the search is to find the next nearest component that can take input focus based on the starting point of the search and the magnitude and direction of the focus change indicated by the present directional navigation indicator.

For example, FIG. 2 can be used to illustrate the significance of searching for the next nearest component that can take input focus. Assume that components 221–224 and 231–234 can each take input focus and that component 231 is the present component at the present moment during a series of directional navigation indicators that are proceeding upward up from component 234 through component 221. If the magnitude and direction of the next directional navigation indicator indicate a stepwise change to the next component in the upward direction, then the navigation change must traverse from a component in container 230 to a component in container 220. Note also that the next component to receive input focus is the lowest level component in a given container. Thus, given the magnitude and direction of the directional navigation indicator in the present example, the next nearest component to receive input focus will be component 224, rather than component 221, given that the starting point of the search was component 231 and the magnitude and direction of the search were stepwise in the upward direction. Larger magnitudes of navigational indicators are handled similarly even though the resulting navigational step may traverse multiple containers to find the lowest level component within a hierarchical set of containers.

If it is determined at decision step 572 that the appropriate component can not be located within the present container, then processing continues at step 575. At step 575, the search for the appropriate component is passed from the present layout manager to another layout manager of another container where the search can continue at step 567. Ideally the search is passed to a layout manager that is responsible for a container that is in the direction of the desired navigation request. Most important is that the search for the next component that can take input focus will continue with the lowest level component within the next container that is nearest to the component that was last considered.

Alternatively, if it is determined at decision step 572 that the appropriate component is located within the container presently being searched, then processing continues at step 580. At step 580, the identity of the component that should receive input focus is communicated to the respective container, and at step 583 the container passes input focus to the identified component. Directional navigation processing is complete at step 590 by returning to step 443 of FIG. 4.

Summary

The directional navigation system is implemented as a method in the layout managers that are responsible for containers and components of a UI. When a component that has input focus receives a user generated keyboard event that translates to a directional navigation indicator, the navigator portion of the responsible layout manager identifies the next component that can take input focus, or the directional navigation indicator is passed to a layout manager than can identify the next component that can take input focus.

Although the methods and systems of the present invention have been described in terms of specific embodiments, it is not intended that the invention be limited to these embodiments, and it is expected that persons skilled in the art can and will make, use, and/or sell alternative directional navigation systems in a manner that is within the scope of the following claims either literally or under the Doctrine of Equivalents. The scope of the present invention is defined only by the claims that follow.

WHAT IS CLAIMED IS:

1. A method of directional navigation among a plurality of components on a display of a computer system having a user interface that includes said display and a user input device, the components being program modules each operational to generate a graphical component feature on the display and to receive input events generated with the user input device, where the component at any given time designated to receive such input events is said to be the component with input focus, the components comprising at least one parent component and a plurality of child components of said at least one parent component, the at least one parent component implementing a local input focus assignment authority, a navigator operational to implement a uniform navigation authority and being in a layout manager that forms a program portion separate from the components, the layout manager operational to layout the components' graphical component features on the display and to provide a determination of which child component in which parent component, shall next receive the input focus based on directional navigational indicator input events generated by the user input device, said method comprising:

assigning said input focus to one of said plurality of child components pursuant to said local input focus assignment authority of a responsible one of said at least one parent component;

identifying a user generated input as one of a plurality of directional navigation indicators that is received by said one of said plurality of child components having said input focus;

determining a next nearest one of said plurality of child components that can take said input focus dictated by a previously identified one of said at least one directional navigation indicators, said determination being made in the layout manager pursuant to said uniform navigation authority of said navigator assigned to said responsible one of said at least one parent component and that operates at a higher level than any of said plurality of components; and instructing an identifiable one of said at least one parent component of said next nearest one of said plurality of child components that can take said input focus, to assign said input focus to said next nearest one of said plurality of child components.

2. A method according to claim 1 including:

assigning said input focus to said next nearest one of said plurality of child components in response to said instructing step.

3. A method according to claim 1 wherein said step of generating includes:

dividing said plurality of components into at least one subset;

assigning a dedicated navigator to each of said at least one subset, said dedicated navigator being part of the layout manager dedicated to and corresponding to each of said at least one subset and being in a program portion separate from said subset; and establishing communications between said dedicated navigator assigned to each of said at least one subset.

4. A method according to claim 1 wherein said step of identifying includes:

determining a magnitude and direction of focus change required by said one of said plurality of directional navigation indicators; and transmitting said magnitude and direction of said focus change along with an identification of said one of said plurality of child components that received said one of said at least one directional navigation indicators, to said navigator in the layout manager for use as a reference point from which said next nearest one of said plurality of child components that can take said input focus can be identified.

5. A method according to claim 1 wherein said step of determining includes:

propagating an unresolved input focus change request from a first navigator in the layout manager to a next navigator until said next nearest one of said plurality of child components is identified.

6. A machine readable memory tangibly embodying instructions executable by a computer to perform a method for directional navigation in a user interface having a display of graphical component features provided by a plurality of program components organized by parent components and child components, the components being program modules each operational to generate a graphical component feature on the display and to receive user generated input, where the component at any given time designated to receive such user generated input is said to be the component with input focus, and having at least one layout manager to control a position and a size of each graphical component feature of said plurality of program components in said display and to determine which component has a directionally next nearest graphical component feature in said display, said method comprising:

defining operational responsibilities and communications between said plurality of program components and said at least one layout manager;

identifying, at a program component level pursuant to the operational responsibilities defined for said program components, a user generated input that requires a change of input focus from a present child component to a next child component;

determining, at a layout manager level pursuant to the operational responsibilities defined for said layout manager, which of said plurality of components in which parent component will be said next child component to have said input focus; and implementing, at a program component level pursuant to the operational responsibilities defined for said program components, said change of said input focus to said next child component.

7. A machine readable memory according to claim 6 wherein said act of identifying includes:

evaluating said user generated input to identify one of a plurality of directional navigation indicators selected from a group comprised of: absolute indicators, logical indicators, and directional indicators;

determining a magnitude and direction of focus change required by said one of said plurality of directional navigation indicators; and transmitting said magnitude and direction of said focus change along with an identification of said present child component that received said one of said at least one directional navigation indicators, to an assigned one of said at least one layout manager for use as a reference point from which said next child component can be identified.

8. A machine readable memory according to claim 6 wherein said step of determining includes:

propagating an unresolved input focus change request from a first layout manager to a next layout manager until said next child component is identified; and communicating an identity of said next child component to receive said input focus from a responsible one of said at least one layout manager to a container responsible for said next child component.

9. A machine readable memory according to claim 6 wherein said step of implementing includes:

communicating an identity of said next child component to receive said input focus from a responsible one of said at least one layout manager to a container responsible for said next child component; and assigning said input focus to said next child component upon command from said container responsible for said next child component.

10. A directional navigation system for a user interface in a computer system having a display of graphical component features provided by a plurality of program components organized by parent components and child components, and having at least one layout manager to control a position and a size of said graphical component features of said plurality of program components in said display, each of said program components being operational to receive user generated inputs, where the component at any given time designated to receive such user generated inputs is said to be the component with input focus, said system comprising:

an active child component having input focus and thereby operational to identify a user generated input that requires a change of said input focus;

a directional navigation portion of each of said at least one layout manager that is operational to determine which one of said plurality of program components is nearest that can take said input focus;

a layout manager protocol to direct propagation of an unresolved input focus change request from a first one of said at least one layout manager that is responsible for a first subset of said plurality of program components to a next one of said at least one layout manager responsible for a second subset of said plurality of program components to determine which of said plurality of program components can take said input focus; and an identifiable container of said one of said plurality of program components that is next to take said input focus, that is operational to implement said change in said input focus.

11. A system according to claim 10 wherein said active child component includes:

means for evaluating said user generated input to identify one of a plurality of directional navigation indicators selected from a group comprised of: absolute indicators, logical indicators, and directional indicators;

means for determining a magnitude and direction of said change of said input focus required by said one of said plurality of directional navigation indicators; and means for transmitting said magnitude and direction of said change of said input focus along with an identification of a present child component that received said one of said at least one directional navigation indicators, to an assigned one of said at least one layout manager for use as a reference point from which a next one of said plurality of program components can be identified to take said input focus.

12. A system according to claim 10 wherein said layout manager protocol includes:

means for communicating an identity of one of said plurality of components that is next nearest to take said input focus from a responsible one of said at least one layout manager to a container responsible for said one of said plurality of components that is next nearest to take said input focus.

13. A system according to claim 10 wherein said identifiable container includes:

means for communicating an identity of one of said plurality of program components that is next to receive said input focus from a responsible one of said at least one layout manager to a container responsible for said one of said plurality of program components that is next nearest to take said input focus; and means for assigning said input focus to one of said plurality of program components that is identified as next nearest to take said input focus in response to said means for communicating said identity to said container responsible for said one of said plurality of program components.

14. A method of assigning which of a plurality of software controls that provide graphical features on a display of a computer is to be recipient of further user input data entered via a user input device, a current one of the plurality of software controls being assigned as user input data recipient is said to be the software control with input focus, the graphical features having locations on the display laid out by a layout manager, the method comprising:

receiving a directional navigational input by the software control currently assigned as user input data recipient;

passing information of the directional navigational input from the software control currently assigned as user input data recipient to the layout manager;

determining by the layout manager which software control's graphical feature is directionally proximate in accordance with the directional navigational input and layout of the software controls' graphical features on the display; and assigning the software control with the directionally proximate graphical feature to be next user input data recipient with input focus.

* * * * *

UNITED STATES PATENT AND TRADEMARK OFFICE
CERTIFICATE OF CORRECTION

PATENT NO.     : 6,249,284 B1                                                   Page 1 of 1
DATED          : June 19, 2001
INVENTOR(S)    : Jeffrey L. Bogdan It is certified that error appears in the above-identified patent and that said Letters Patent is hereby corrected as shown below:

Column 1,
Line 46, "he use" should read -- the use --.

Column 11,
Lines 34 and 38, "plurality of components" should read -- plurality of program components --.

Signed and Sealed this

Eleventh Day of November, 2003

JAMES E. ROGAN
*Director of the United States Patent and Trademark Office*